(12) United States Patent
Lee

(10) Patent No.: US 6,542,506 B1
(45) Date of Patent: Apr. 1, 2003

(54) METHOD OF TRANSFERRING DATA BETWEEN NETWORKS

(75) Inventor: Hee-Jin Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/375,566

(22) Filed: Aug. 17, 1999

(30) Foreign Application Priority Data

Aug. 17, 1998 (KR) .............................................. 98-33283

(51) Int. Cl.⁷ ................................................ H04L 12/56
(52) U.S. Cl. .................................. 370/395.31; 370/401
(58) Field of Search .................................. 370/229, 235, 370/236, 395.1, 398, 399, 395.2, 395.3, 395.31, 469, 401

(56) References Cited

U.S. PATENT DOCUMENTS

| | | | |
|---|---|---|---|
| 6,009,097 A | * 12/1999 | Han | 370/395.52 |
| 6,115,385 A | * 9/2000 | Vig | 370/401 |
| 6,185,213 B1 | * 2/2001 | Katsube et al. | 370/396 |
| 6,341,127 B1 | * 1/2002 | Katsube et al. | 370/230 |
| 6,389,023 B1 | * 5/2002 | Matsuzawa et al. | 370/395.31 |

FOREIGN PATENT DOCUMENTS

| | | | |
|---|---|---|---|
| JP | 63-211842 | 9/1988 | H04L/11/20 |
| JP | 10-112730 | 4/1998 | H04L/12/66 |
| JP | 10-200583 | 7/1998 | H04L/12/66 |
| JP | 11-68755 | 3/1999 | H04L/12/28 |
| WO | 98/18239 | 4/1998 | H04L/12/46 |

* cited by examiner

Primary Examiner—Kwang Bin Yao
(74) Attorney, Agent, or Firm—Sughrue Mion, PLLC

(57) ABSTRACT

A method of transferring data between networks includes storing a connection path set between predetermined data from a first network and a predetermined address in a second network during initial connection between the first and second networks, and transferring the predetermined data from the first network along the stored path. Accordingly, data transmission speed is faster by pre-mapping a data path between networks, and hardware and software loads on the gateway for repeating data between networks can be reduced.

5 Claims, 4 Drawing Sheets

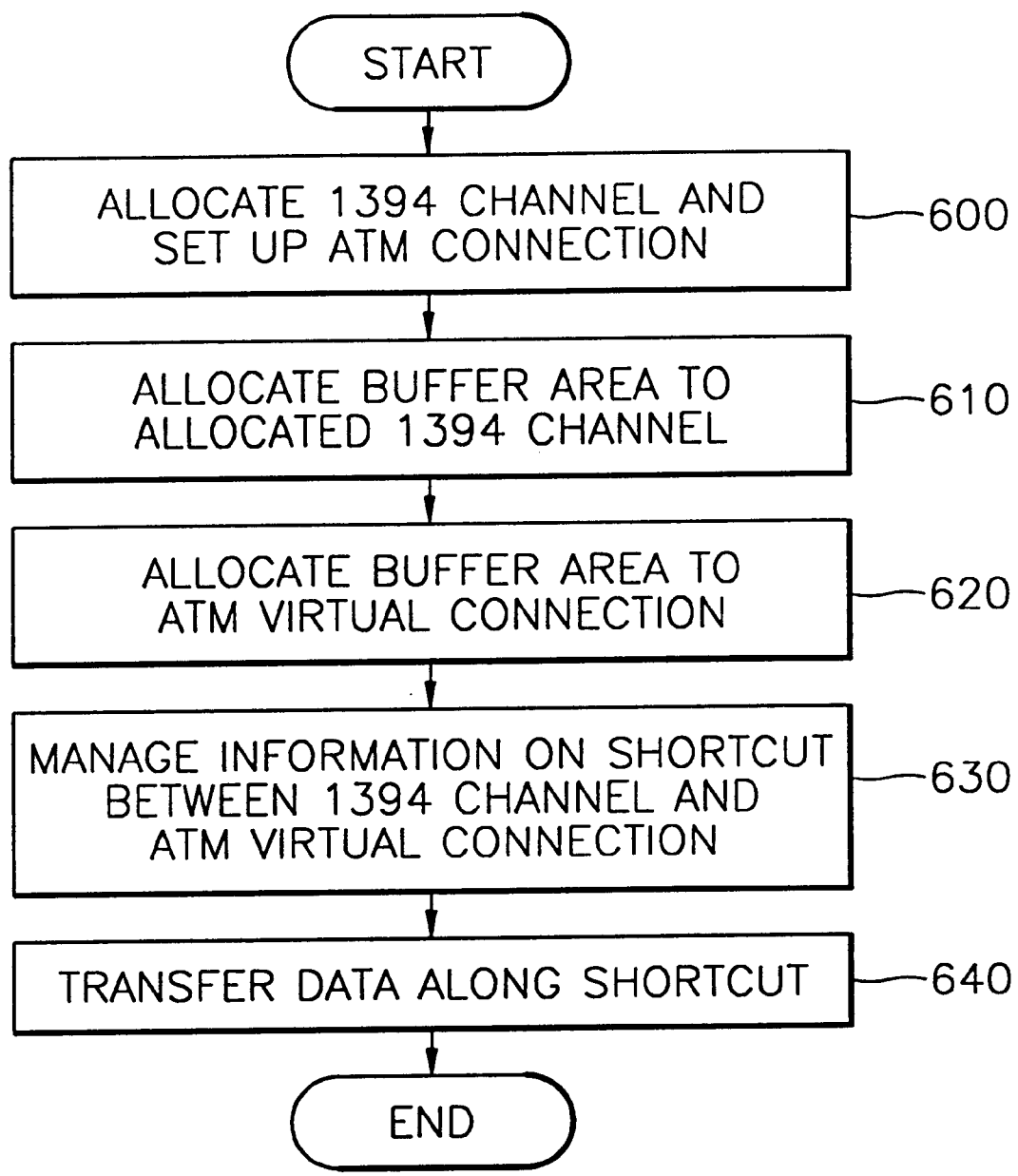

METHOD OF TRANSFERRING DATA BETWEEN NETWORKS

BACKGROUND OF THE INVENTION

1. Field of the Invention

The present invention is based on Korean Application No. 98-33283 filed on Aug. 17, 1998, which is incorporated herein by reference, and relates to an inter-network communications method, and more particularly, to a method of forming a shortcut between networks, by which data is transferred via the shortest route along a preset data transfer path during transfer of data between different networks.

2. Description of the Related Art

FIG. 1 shows the configuration of a gateway for connecting a conventional IEEE 1394 to an asynchronous transfer mode (ATM). In the ATM transfer method, data transmitted via a communication line is divided into small pieces called cells, and the cells are transferred at high speed in an asynchronous system. The ATM transfer method is usually used in broadband ISDN environments to transfer large-capacity multimedia information including images and sounds. With multimedia communications services increasing, the ATM transfer method is highly regarded as a means for high-speed data communications.

A gateway is a device for connecting a local area network (LAN) to another communications network. That is, the gateway is used to connect two different LANs to each other or to connect a LAN to an external long distance network.

Generally, a variety of communication networks are used throughout the world, and each has a unique system. That is, each communication network uses a unique data format and a unique communication protocol. Since direct transfer of data from one network to another network is impossible due to the differences in data format and protocol between the networks, a gateway is connected between the two networks as a mediator for solving the transfer difference between the two networks.

IEEE 1394 (hereinafter referred to as 1394), which is a high-speed serial bus, follows an addressing system called a CSR structure (ISO/IEC 13213:1994). Also, the 1394 is imply used in a plug-and-play system, and provides an isochronous transmission system for multimedia services and an asynchronous transmission system for management. Transfer rates of 100 Mbps, 200 Mbps and 400 Mbps are already available, and a 800 Mbps transfer rate and a gigabit transfer rate are expected to be available in IEEE 1394.

International Engineering Task Force (IETF) has been discussing an IP over the 1394 (IPover1394) to accomplish compatibility of TCP/IP (transmission control protocol/Internet protocol) with the 1394, and the IP over 1394 enables Internet access or the like. Here, the 1394 acts as the link and physical layers of a TCP/IP suite. The 1394 can also connect a digital home appliance, a computer and its peripheral apparatuses to one network and can guarantee QOS (Quality of Services), thus receiving attention as a home LAN.

The gateway of FIG. 1 includes a 1394 protocol layer 100 for processing a received 1394 signal or processing a received signal into a 1394 signal, an ATM protocol layer 110 for processing a received ATM signal or processing a received signal into an ATM signal, and an IP layer 120 for processing IP data received from the 1394 protocol layer 100 or ATM protocol layer 110.

The 1394 protocol layer 100 is comprised of a 1394 physical layer 101, a 1394 link layer 102, a transaction layer 103, a 1394 mapping layer 104 and an IP over 1394 (IPover1394) layer 105. The 1394 physical layer 101 is connected to an IEEE 1394 bus and transmits or receives a physical signal therethrough. The 1394 link layer 102 makes a data packet by attaching a header or the like to a signal received from the 1394 physical layer 101. The transaction layer 103 is a protocol layer for processing a 1394 asynchronous packet. The 1394 mapping layer 104 facilitates use of the 1394. The IP over 1394 layer 105 fragments an IP datagram and reassembles the IP diagram fragments according to the IP over 1394 under discussion.

The ATM protocol layer 110 is comprised of an ATM physical layer 111, an ATM link layer 112, an ATM mapping layer 113, a signaling layer 114, and an IP over ATM (IPoverATM) layer 115. The ATM physical layer 111 is connected to an ATM network data bus and transmits or receives physical or electrical signals therethrough. The ATM link layer 112 attaches a predetermined header to data received from the ATM physical layer 111 and transfers the resultant data. The ATM mapping layer 113 cuts data into pieces of data suitable for the ATM. The signaling layer 114 sets a virtual channel VC and a virtual path VP in the ATM. The IP over ATM layer 115 performs conversion such as obtaining an ATM address corresponding to an IP address. The IP layer 120 routs the IP datagram.

In the operation of the conventional gateway of FIG. 1, when data is transmitted from the 1394 to the ATM, an IP datagram received via the 1394 network in the gateway is reassembled by the IP mapping layer 104 and the IP over 1394 layer 105 and provided to the IP layer 120. The IP layer 120 searches for a path for the destination address of the data in a predetermined routing table. A virtual channel and a virtual path are obtained by the IP over ATM layer 115 and the signaling layer 114, and the IP datagram is processed into ATM cells through the ATM mapping layer 113, the ATM link layer 112 and the ATM physical layer 111, and then the data cells are transmitted to the ATM network. On the other hand, when data is transmitted from the ATM to the 1394, data cells received from the ATM in the gateway are reassembled and provided to the IP layer 120. The IP layer 120 detects a 1394 node ID corresponding to the destination address of the data, converts the data into a 1394 signal format, and transmits the resultant data to the detected node ID in the 1394 network.

As described above, the conventional protocol must be controlled by network layers in order to transmit signals between different networks, which wastes time and memory resources due to the processing operation of a central processing unit (CPU) and the copying operation of a memory for the above control operation.

SUMMARY OF THE INVENTION

To solve the above problem, it is an object of the present invention to provide a method of forming a network path, by which a connection of data stream to be transferred between two different networks is set up early during data transmission upon connection between the networks, and then data repetition is accomplished in the second layer of each network according to the set connection without need to use a CPU for each packet when a gateway for mediating networks transmits data.

To achieve the above object, the present invention provides a method of transferring data between networks comprising the steps of: storing a connection path which is set between predetermined data from a first network and a predetermined address in a second network during initial connection between the first and second networks; and transferring the predetermined data from the first network along the stored path.

It is preferable that transfer of the predetermined data from the first network along the stored path is network layer 2 switching transmission.

To accomplish the above object, the present invention provides a method of transferring data between networks in a gateway for connecting an IEEE 1394 network to another predetermined network, the method comprising the steps of: (a) storing a data movement path set between the channel number of initial channel data generated by the IEEE 1394 network and the other network to which the data is to be transferred; and (b) transferring subsequent data of the same channel from the 1394 network along the stored data movement path.

It is preferable that the step (a) comprises the substeps of: setting the relationship between a channel number from the 1394 network and a predetermined memory area in the second protocol layer for the 1394 network; and storing a connection setup path from the 1394 network to the other network, as well as the predetermined memory area position associated with the connection setup path, in the second protocol layer for the other network.

It is preferable that the step (b) comprises the substeps of: storing data of the same channel transmitted from the 1394 network in the set memory area; and transferring the data stored in the memory area along the connection setup path, which is mapped with the memory area and stored in the second protocol layer for the other network.

Preferably, the other network is an asynchronous transfer mode (ATM) network.

It is preferable that the link layer for the ATM network stores the memory area, and a connection-setup virtual channel and a connection-setup virtual path.

Also, it is preferable that data of a predetermined channel transmitted from the IEEE 1394 network is stored in a predetermined memory area set in the 1394 link layer after initial connection setup, and the data in the memory area is moved to the link layer for the ATM network and transferred to an address in the ATM network along a virtual channel and a virtual path which are set by mapping to the memory area in the link layer for the ATM network.

BRIEF DESCRIPTION OF THE DRAWINGS

The above object and advantage of the present invention will become more apparent by describing in detail a preferred embodiment thereof with reference to the attached drawings in which:

FIG. 6 is a flowchart illustrating a method of transferring data between an 1394 and an ATM network along a shortcut in the gateway of FIG. 4.

DESCRIPTION OF THE PREFERRED EMBODIMENT

Figure 1:
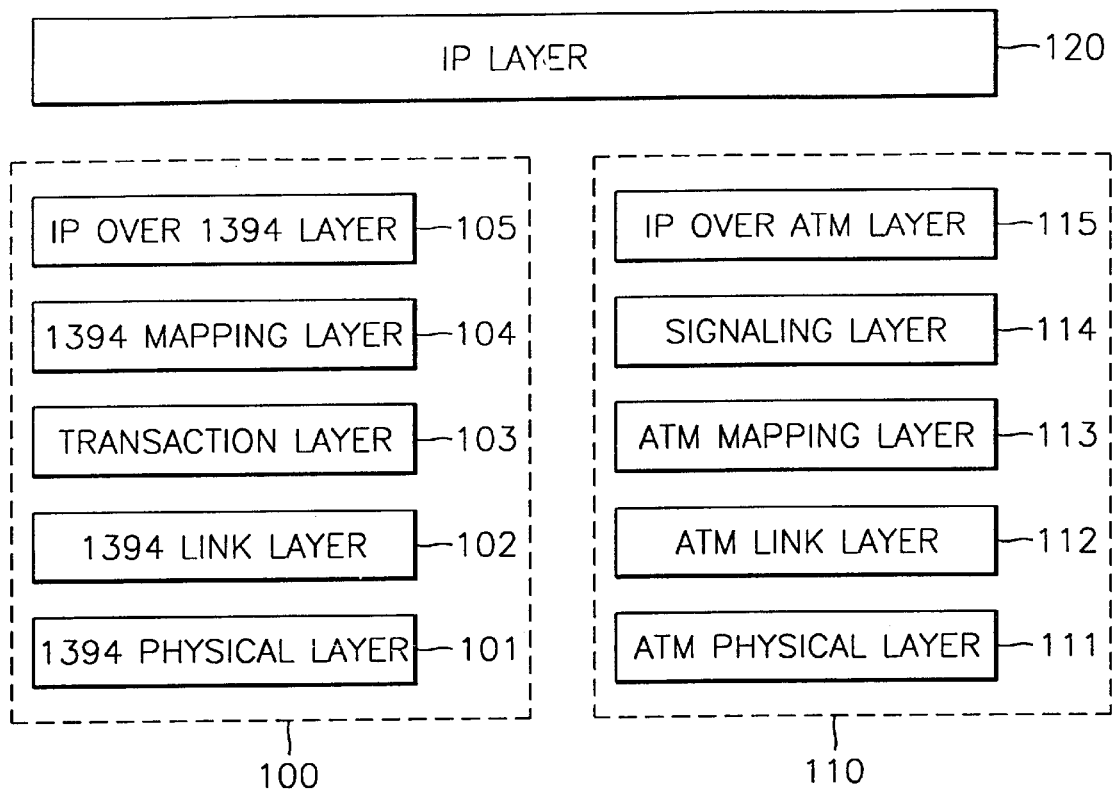
FIG. 1 is a block diagram showing the configuration of a conventional gateway for connecting an IEEE 1394 to an asynchronous transfer mode (ATM)
Figure 2:
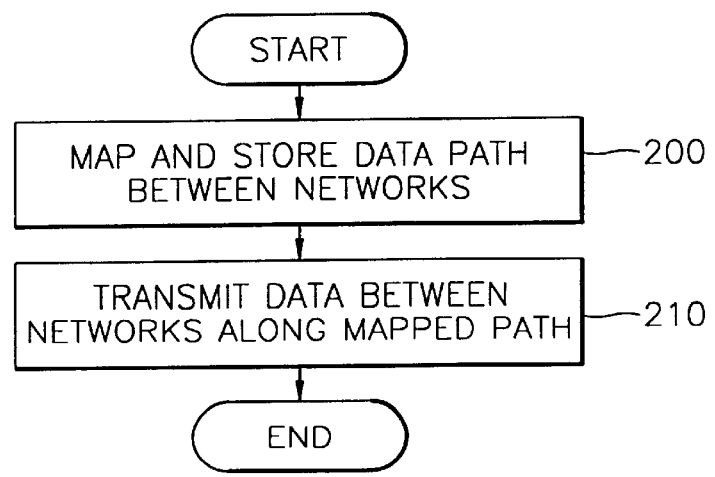
FIG. 2 is a flowchart illustrating a method of transferring data between networks along a shortcut.

Referring to FIG. 2, in order to transfer data between first and second networks (not shown), a path along which predetermined data from the first network is to be transmitted to a predetermined address of the second network is stored upon initial connection of the first network to the second network, in step 200. The predetermined data is transmitted from the first network to the link layer of the second network along the stored path, in step 210. Network layer 2 switching transmission is transmission of predetermined data of the first network along a path stored in the second layer in the second network. Thus, there is no need to undergo operations such as an attaching operation in which a header containing the address information of the other network is attached to data in each protocol layer in a corresponding network whenever data is transmitted between the different networks. That is, data can be transmitted by passing through only the second layer in each network without passing through all layers in each network.

Figure 3:
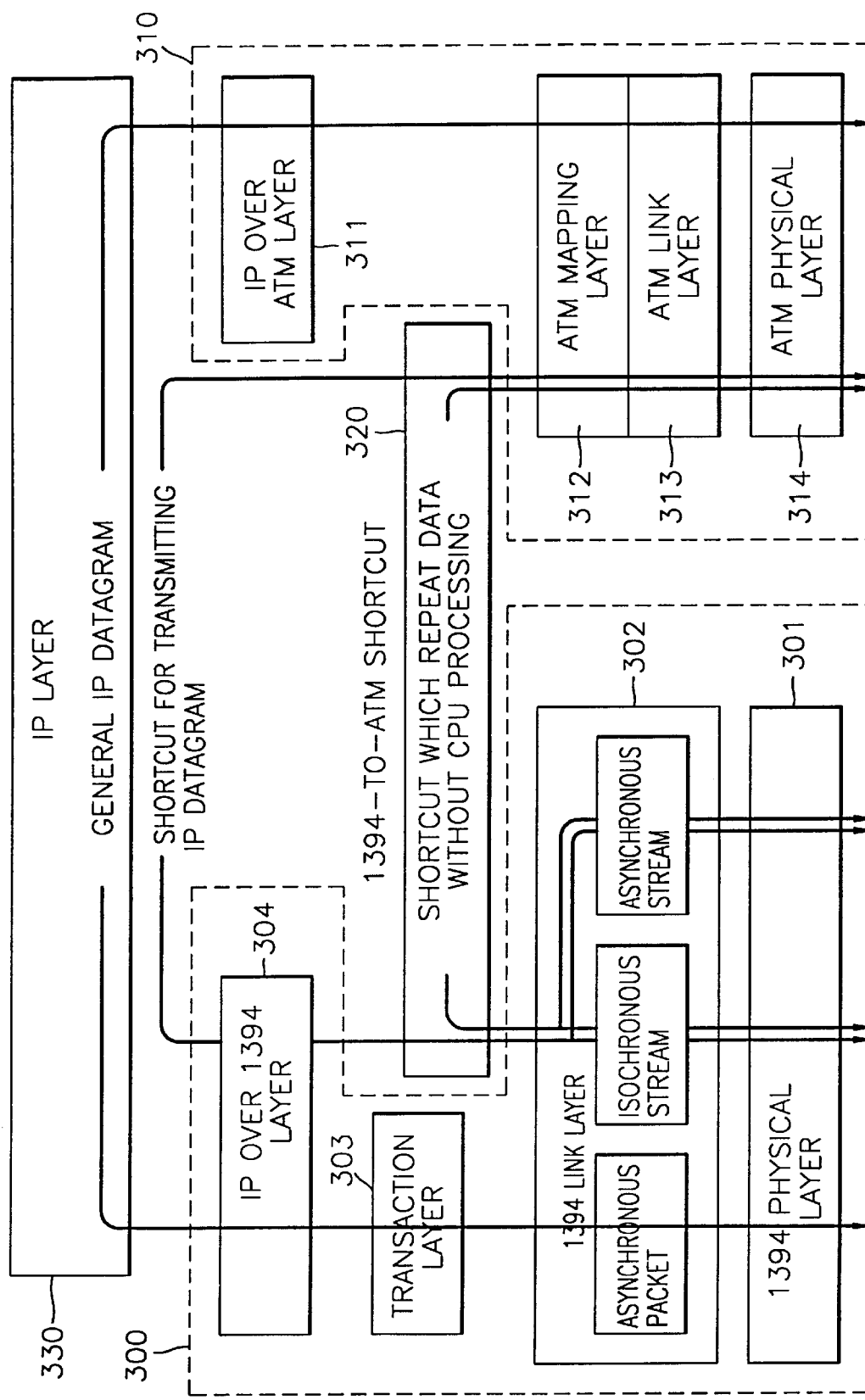
FIG. 3 is a block diagram showing the configuration of a gateway for mediating inter-network communications, according to the present invention.

FIG. 3 shows the configuration of a gateway for mediating communications between networks, according to the present invention. The gateway includes a 1394 protocol layer 300, an ATM protocol layer 310, a 1394-to-ATM shortcut 320 and an IP layer 330 in order to mediate communications between an IEEE 1394 network and an ATM network. The 1394 protocol layer 300 processes a received 1394 signal or processes a received signal into a 1394 signal. The ATM protocol layer 310 processes a received ATM signal or processes a received signal into an ATM signal. The 1394-to-ATM shortcut 320 relays a data transmission path between the 1394 network and the ATM network. The IP layer 330 processes IP data provided from the 1394 protocol layer 300 or ATM protocol layer 310.

The 1394 protocol layer 300 is comprised of a 1394 physical layer 301, a 1394 link layer 302, a transaction layer 303, an IP over 1394 layer 304. The 1394 physical layer 301 is connected to an IEEE 1394 bus and transmits or receives through the bus. The 1394 link layer 302 makes a data packet by classifying data received from the 1394 physical layer 301 and attaching a header containing the channel information or destination information of the 1394 to the classified data. Here, the data packet can be classified into an asynchronous packet, an isochronous stream, or an asynchronous stream. When network data is first provided, the 1394 link layer 302 sets and memorizes the relationship between a channel number of the 1394 network and an area of a predetermined buffer memory (not shown) to store the provided data in. Then, when another 1394 data having the set channel number is provided to the 1394 link layer 302, the 1394 link layer 302 stores the 1394 data in a corresponding area according to the relationship between the channel and the buffer memory area. Here, the stored data is an IP datagram not having a header or anything else. The transaction layer 303 is a protocol layer for processing a 1394 asynchronous packet. The IP over 1394 layer 304 converts various 1394 data like an asynchronous packet, an isochronous stream and an asynchronous stream into IP signals.

The ATM protocol layer 310 is comprised of an IP over ATM layer 311, an ATM mapping layer 312, an ATM link layer 313 and an ATM physical layer 314. The IP over ATM layer 311 obtains an ATM address and attaches the ATM address information to the IP datagram. The ATM mapping layer 312 cuts the data received from the IP over ATM layer 311 into ATM cells. The ATM link layer 313 performs an operation for transmitting the data received from the ATM mapping layer 312 to a terminal address, that is, a virtual channel (VC) and a virtual path (VP) obtained by the IP over ATM layer 311. The ATM link layer 313 stores the relationship between the area of the buffer memory where the first data is stored and a VC and a VP in the ATM network whose connection to the first data is set up by signaling the first data transmitted from the 1394 network to an address to which the transmitted first data is to be sent. Thus, subsequent data from the 1394 network can be transferred to the VC and the VP which recalls data stored in an area of the buffer memory by using only the buffer memory area information. The ATM physical layer 314 converts ATM data transmitted from the ATM link layer 313 into a physical signal and transmits the physical signal to the ATM network.

The 1394-to-ATM shortcut 320 is a virtual layer for providing a path between a channel number of the 1394 and a virtual connection which is a terminal address of the ATM network. Provisions of the path between the 1394 and the ATM by the 1394-to-ATM shortcut 320 can be achieved by storing the relationship between a 1394 channel and a buffer memory area and the relationship between the buffer memory area and a VC and VP in the ATM during initial data transmission between networks in the above-described layers for the 1394 network and the ATM network. When data of a predetermined number of the 1394 is first transmitted to the ATM network, it passes through all network layers, during which the relationship between a corresponding 1394 channel and a buffer memory area and the relationship between the buffer memory area and corresponding ATM VC and VP are set and stored in the virtual 1394-to-ATM shortcut 320. When subsequent data of the same channel from the 1394 network is transmitted to the ATM network, it is provided only up to the link layer for the 1394 network, passes through the 1394-to-ATM shortcut 320, and is then transferred directly to the ATM mapping layer 312 for the ATM network, so that data processing operations in many different layers traversed by the initial signal are omitted.

The IP layer 330 routes an IP datagram. The component elements of the gateway of FIG. 3 are used to describe data transmission from the 1394 to the ATM, but data transmission from ATM to 1394 also can be made along the above-described shortcut on the basis of the configuration of FIG. 3. A packet sender (not shown) in the 1394 network allocates signal channels of the 1394 network, but a gateway or nodes in the 1394 network can allocate them in some cases.

Figure 4:
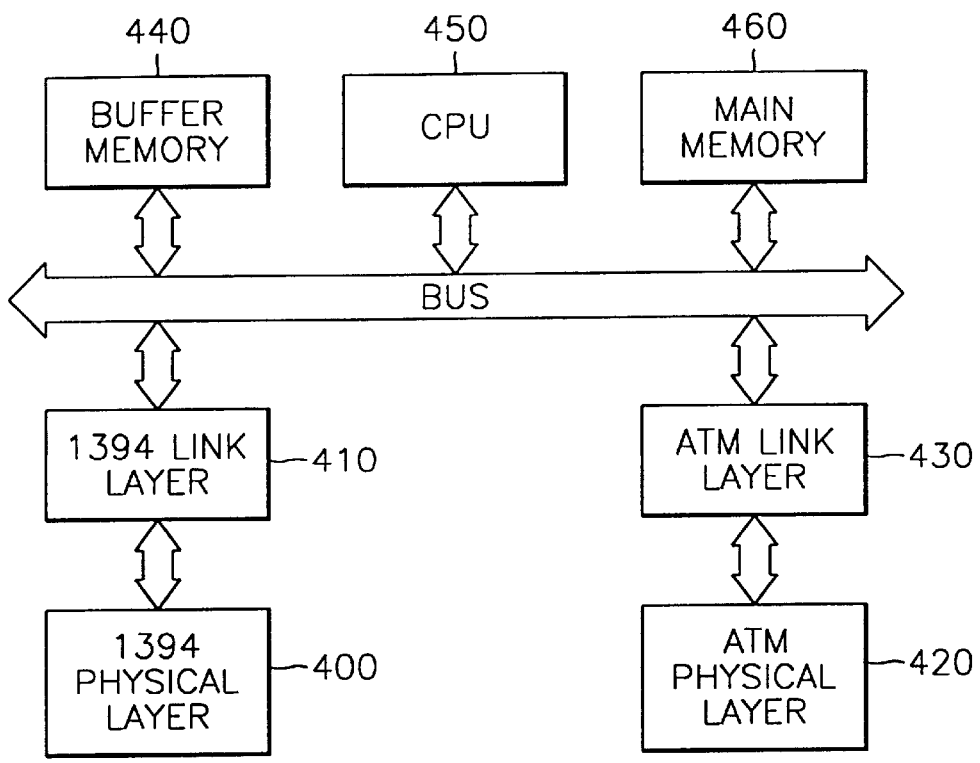
FIG. 4 is a block diagram showing the hardware configuration of the gateway of FIG. 3 which provides a shortcut between networks.

FIG. 4 is a block diagram showing the hardware configuration of the gateway of FIG. 3 which provides a shortcut between networks. The gateway includes a 1394 physical layer 400, a 1394 link layer 410, an ATM physical layer 420, an ATM link layer 430, a buffer memory 440, a CPU 450 and a main memory 460. The 1394 physical layer 400 processes a physical signal of 1394 data. The 1394 link layer 410 allocates a predetermined area in the buffer memory 440 for a currently-transmitted channel number of the 1394 network, and stores subsequently transmitted data having the same channel number in the previously-allocated buffer area. The ATM link layer 430 stores a VC and a VP whose connection to initial transmitted data is set up, in association with a buffer area. The ATM link layer 430 receives information on the area in the buffer memory 440 where data is input from the CPU 450, brings the data stored in the corresponding area of the buffer memory 440, and recognizes the VC and VP set in association with the corresponding area of the buffer memory 440 as an ATM address, thereby performing corresponding data processing. The buffer memory 440 can directly access the 1394 link layer and stores 1394 data of a predetermined channel in a predetermined memory area according to the relationship set in the 1394 link layer 310. The CPU 450 recognizes 1394 channel data when it is written in the buffer memory 440, informs the ATM link layer 430 of the recognized 1394 channel data, and performs operations such as connection setup for the data to connect with the destination address of ATM during transmission of the initial 1394 channel data to the ATM. The main memory 460 is a peripheral memory for supporting operations such as a connection setup performed by the CPU 450.

Figure 5:
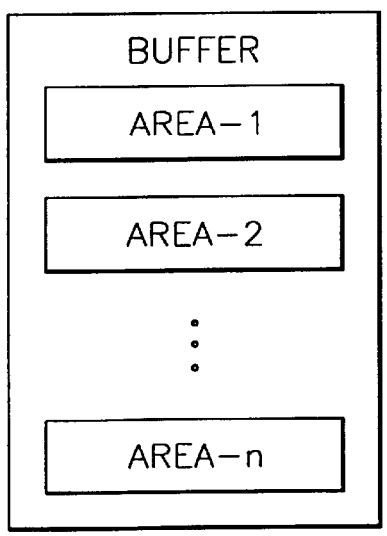
FIG. 5 is a block diagram of the buffer of FIG. 4.

FIG. 5 shows the buffer memory 440 of FIG. 4. A predetermined area of the buffer memory 440 is mapped with data having a predetermined 1394 channel number. The predetermined area of the buffer memory 440 is also mapped with a VC and a VP in the ATM (ATM virtual connection). Finally, a path between the predetermined 1394 channel data and the ATM virtual connection is set.

FIG. 6 is a flowchart illustrating a method of transferring data between the 1394 network and the ATM network in the gateway of FIG. 4. When a channel is allocated between the gateway and the 1394 network, the gateway sets up a virtual connection between information which is given from a source node in the 1394 network and an ATM terminal address, in step 600. A specific area in the buffer memory of FIG. 5 is allocated to the allocated 1394 channel, in step 610. The area allocated in step 610 is mapped with the ATM virtual connection to be mapped to the 1394 channel, and allocated to the ATM virtual connection, in step 620. This is performed by setting the main memory 450 in the ATM mapping layer 313. Information corresponding to a shortcut between the 1394 channel and the ATM virtual connection is managed by the 1394-to-ATM shortcut 320 of FIG. 3, in step 630. Once the shortcut is set, subsequent data of the path-set channel received from the 1394 network is transferred along the set shortcut without determination of destination information or the like, in step 640.

In the gateway according to the present invention which repeats data between networks using different protocols, a movement path of predetermined data to a different network is set upon initial network connection, so that subsequent data is transmitted along the set path without undergoing packet classification or routing. Hence, the data processing rate is faster, and memory copying during data path searching performed in the gateway is reduced, thereby minimizing the overhead of the gateway. Also, the 1394 network can extend a service for a synchronous signal to outside of a 1394 local bus.

According to the present invention, data transmission speed becomes faster by pre-mapping a data path between networks, and hardware and software loads on the gateway for repeating data between networks can be reduced.

What is claimed is:

1. A method of transferring data between networks in a gateway for connecting an IEEE 1394 network to another predetermined network, the method comprising:

(a) storing a data movement path set between the channel number of initial data generated by the IEEE 1394 network and the other network to which the data is to be transferred; and (b) transferring subsequent data of the same channel from the 1394 network along the stored data movement path;

wherein the storing operation (a) comprises:

setting the relationship between a channel number from the 1394 network and a predetermined memory area in the second protocol layer for the 1394 network; and storing a connection setup path from the 1394 network to the other network, as well as the predetemined memory area position associated with the connection setup path, in the second protocol layer for the other network.

2. The method of transferring data between networks of claim 1, wherein the transferring operation (b) comprises:

storing data of the same channel transmitted from the 1394 network in the set memory area; and transferring the data stored in the memory area along the connection setup path, which is mapped with the memory area and stored in the second protocol layer for the other network.

3. The method of transferring data between networks of claim 2, wherein the other network is an asynchronous transfer mode (ATM) network.

4. The method of transferring data between networks of claim 3, wherein the link layer for the ATM network stores the memory area, as well as a connection-setup virtual channel and a connection-setup virtual path which are mapped to the memory area.

5. The method of transferring data between networks of claim 4, comprising:

storing data of a predetermined channel transmitted from the IEEE 1394 network in a predetermined memory area set by mapping with the channel in the 1394 link layer, after initial connection setup; and moving the data in the memory area to the link layer for the ATM network, and transferring the data to an address in the ATM network along a virtual channel and a virtual path which are set by mapping to the memory area in the link layer for the ATM network.

* * * * *